United States Patent
Warashina et al.

(10) Patent No.: US 9,863,548 B2
(45) Date of Patent: Jan. 9, 2018

(54) ELECTROMAGNETIC VALVE

(71) Applicant: HAMANAKODENSO CO., LTD., Kosai, Shizuoka-Pref. (JP)

(72) Inventors: Tomoaki Warashina, Toyohashi (JP); Takao Ishida, Toyohashi (JP); Masashi Sugano, Kosai (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 0 days.

(21) Appl. No.: 15/252,563

(22) Filed: Aug. 31, 2016

(65) Prior Publication Data
US 2017/0146149 A1 May 25, 2017

(30) Foreign Application Priority Data
Nov. 23, 2015 (JP) .................................. 2015-228273

(51) Int. Cl.
*F16K 31/06* (2006.01)
*F16H 61/02* (2006.01)

(52) U.S. Cl.
CPC ..... *F16K 31/0686* (2013.01); *F16H 61/0251* (2013.01); *F16K 31/0655* (2013.01); *F16K 31/0675* (2013.01)

(58) Field of Classification Search
CPC ............. F16K 31/0693; F16K 31/0686; F16K 31/0675; F16K 31/0624; F16K 31/42; F16K 27/029; Y10T 137/87217; Y10T 137/86622; F16H 2061/0253
See application file for complete search history.

(56) References Cited

U.S. PATENT DOCUMENTS

| | | | | |
|---|---|---|---|---|
| 5,669,675 A * | 9/1997 | Mueller | .................. | B60T 8/363 303/119.2 |
| 5,853,028 A * | 12/1998 | Ness | .................. | G05D 16/2013 137/625.65 |
| 6,021,997 A * | 2/2000 | Hell | ..................... | F15B 13/0403 251/129.07 |
| 6,321,767 B1 * | 11/2001 | Seid | .................... | F16K 31/0613 137/15.21 |
| 6,418,967 B1 * | 7/2002 | Frei | .................... | G05D 16/2013 137/596.17 |
| 7,398,764 B2 * | 7/2008 | Koehler | ............. | F02M 63/0017 123/446 |

(Continued)

FOREIGN PATENT DOCUMENTS

JP 2004-286097 A 10/2004

*Primary Examiner* — Matthew W Jellett
(74) *Attorney, Agent, or Firm* — Harness, Dickey & Pierce, P.L.C.

(57) ABSTRACT

An electromagnetic valve includes a valve compartment inside an end tubular portion of a housing, a valve element provided in the valve compartment and movable to open or close an inlet passage, a support member slidably supporting the valve element, a shaft contacting an end of the valve element to move the valve element, and a pressure release passage extending through a part of the end of the valve element which does not contact the shaft. An inner compartment of the valve element communicates with a drainage passage through the pressure release passage in an open state of the valve element where the inlet passage is open to allow a working fluid flows from an upstream passage to a downstream passage through the inlet passage.

2 Claims, 3 Drawing Sheets

(56) References Cited

U.S. PATENT DOCUMENTS 9,157,539 B2 * 10/2015 Mayr ................... F16K 17/00
9,297,474 B2 * 3/2016 Suzuki ............... F16K 31/0675
9,423,045 B2 * 8/2016 Mills .................. F16H 61/0009

* cited by examiner

FIG. 1   AXIAL DIRECTION
UPSTREAM ⇌ DOWNSTREAM

ELECTROMAGNETIC VALVE

CROSS REFERENCE TO RELATED APPLICATION

This application is based on and incorporates herein by reference Japanese Patent Application No. 2015-228273 filed on Nov. 23, 2015.

TECHNICAL FIELD

The disclosure of the present specification relates to an electromagnetic valve used as a device that switches a flow pathway in a passage of working fluid.

BACKGROUND

An electromagnetic valve disclosed in Patent Document (JP 2004-286097 A) is a device capable of switching a flow pathway in which a working fluid flows. According to the electromagnetic valve of the Patent Document, at the time of non-energization thereof, a pressure of the working fluid causes a ball valve to open an inflow valve port and close a discharge valve port. At the time of energization of the electromagnetic valve, an electromagnetic force from a solenoid portion causes the shaft to be driven toward the ball valve and press the ball valve. Thus, the ball valve moves to open the discharge valve port and close the inflow valve port.

In the electromagnetic valve of the Patent Document, a pressure applied to the ball valve increases when a supply pressure of the working fluid increases. Thus, a necessary force for driving the shaft to close a communication passage and causing the fluid to flow from an inflow passage to a discharge passage may become large. In order to enhance the force for driving the shaft, a large solenoid portion may be required, and an entire size of the electromagnetic valve may become large.

SUMMARY

It is an objective of the present disclosure to provide an electromagnetic valve capable reducing a device size by limiting a necessary valve driving force.

According to an aspect of the present disclosure, an electromagnetic valve includes a housing, an inlet passage, a valve element, a support member, a shaft and an electromagnetic solenoid portion. The housing includes an end tubular portion fitted to an attachment hole of a passage forming member, and a valve compartment positioned on an inner side of the end tubular portion. The passage forming member includes an upstream passage through which a working fluid flows toward the electromagnetic valve, and a downstream passage through which the working fluid flows out of the electromagnetic valve. The inlet passage is positioned on the inner side of the end tubular portion, and the upstream passage and the valve compartment communicates with each other through the inlet passage. The valve element is provided in the valve compartment to open or close the inlet passage in between an open state in which the working fluid is allowed to flow from the upstream passage through the inlet passage to the downstream passage and a closed state in which a flow of the working fluid is shut off. The support member includes a fixed portion fixed on the inner side of the end tubular portion, the inlet passage extending through the fixed portion, and a shaft portion having a shape extending downstream from the fixed portion and supporting the valve element slidably in an axial direction. The shaft presses and moves the valve element in the axial direction to be in the closed state. The electromagnetic solenoid portion generates a driving force for driving the shaft upstream. The valve element includes: a tubular body having a bottom portion pressed against the shaft and having an inner surface contacting an outer surface of the shaft portion; a pressure release passage extending through a part of the bottom portion which does not contact the shaft; and an inner compartment that is provided inside the tubular body and communicates with a drainage passage through the pressure release passage in the open state of the valve element.

According to the electromagnetic valve, in the open state where the working fluid flows from the upstream passage to the downstream passage through the inlet passage, the inner compartment of the valve element and the drainage passage communicate with each other through the pressure release passage that extends through the bottom portion of the valve element. Therefore, a pressure in the inner compartment of the valve element can be released toward the drainage passage through the pressure release passage. Hence, when a supply pressure of the working fluid acts on the valve compartment through the inlet passage, a pressure in the inner compartment of the valve element also increases. However, the pressure in the inner compartment of the valve element can be released downstream through the pressure release passage, and thus a pressure pressing the bottom portion of the valve element downstream can be limited. Since the pressure pressing the valve element downstream can be limited, a force generated by the electromagnetic solenoid portion for driving the shaft upstream can be reduced. Since the driving force of the electromagnetic solenoid portion can be reduced, a flow rate characteristic can be ensured without enlarging the electromagnetic valve. According to the electromagnetic valve, size reduction of the device can be achieved by limiting a necessary force for driving the valve element.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
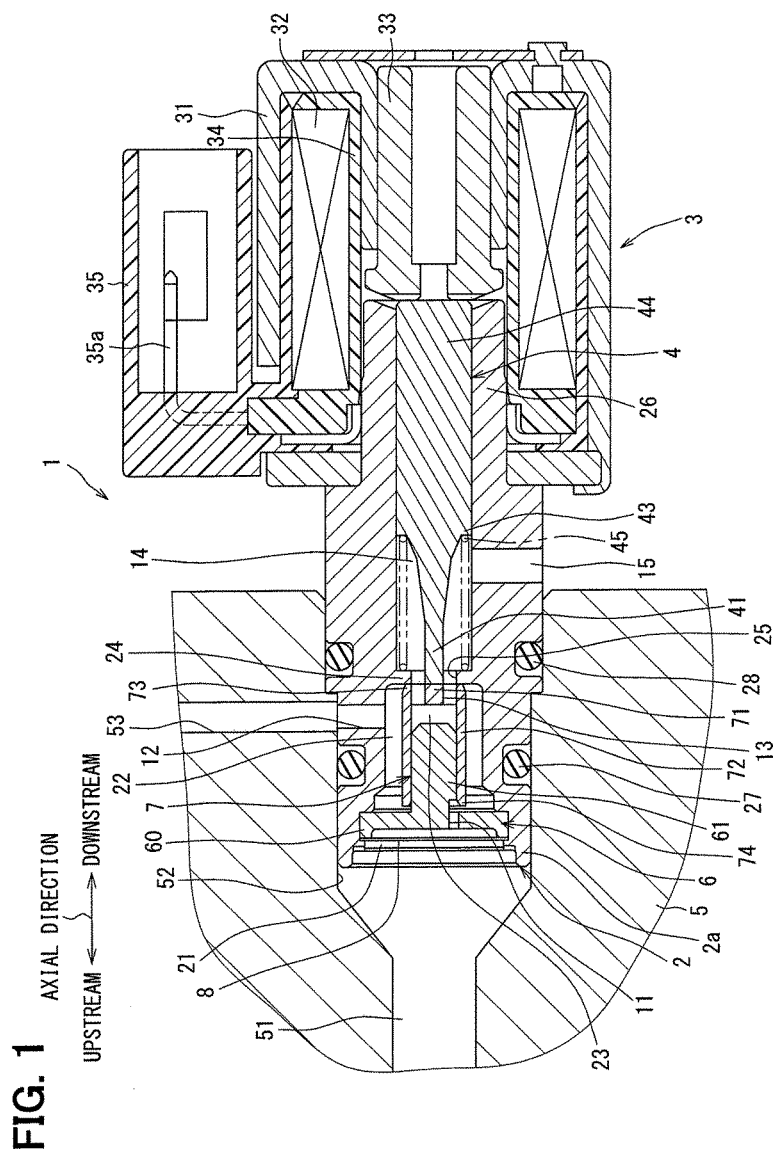
FIG. 1 is a sectional diagram illustrating an electromagnetic valve according to an exemplar embodiment of the present disclosure.
Figure 2:
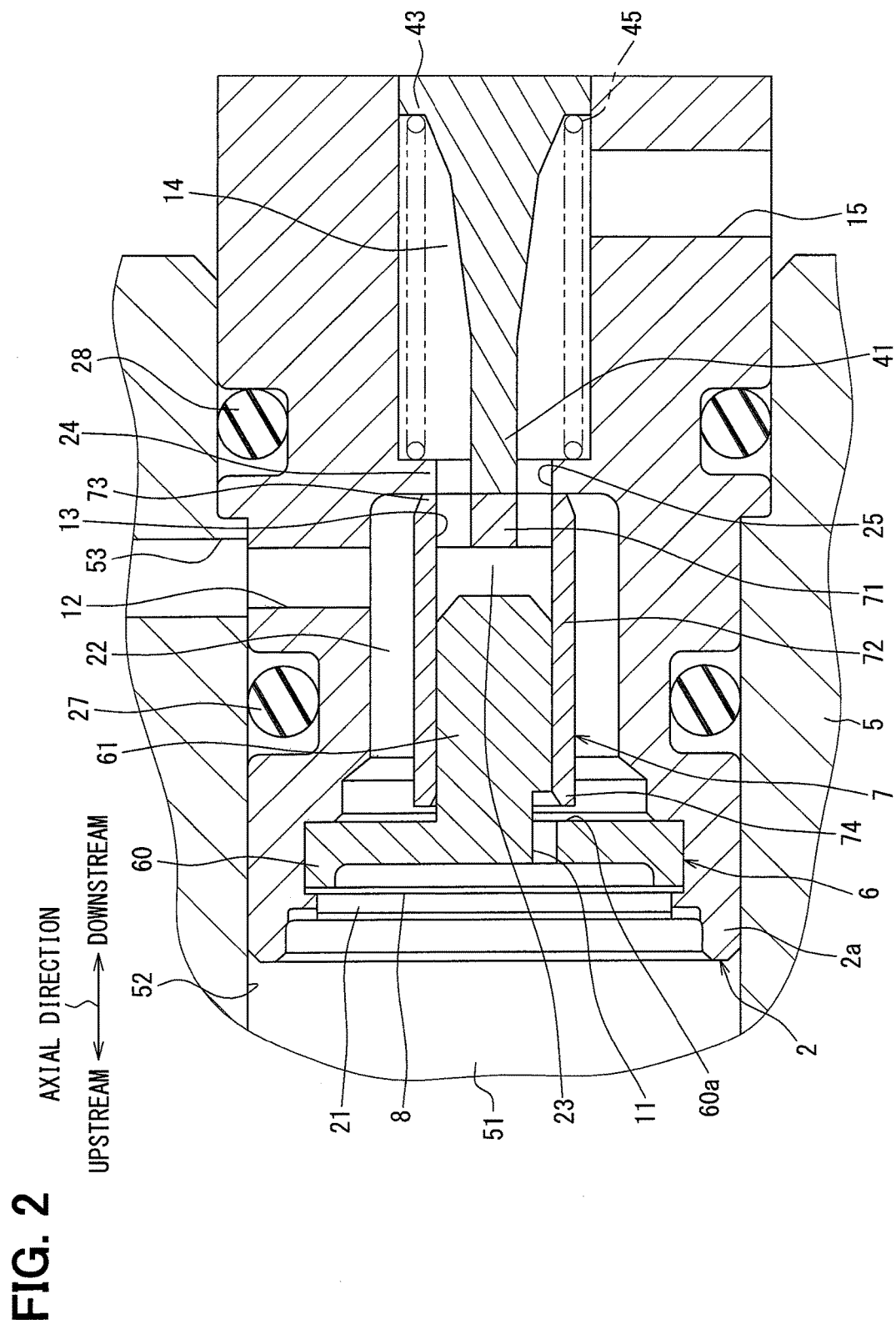
FIG. 2 is a sectional diagram illustrating a part of the electromagnetic valve according the exemplar embodiment.

An electromagnetic valve 1 according to an exemplar embodiment will be described referring to FIGS. 1 to 3. FIG. 1 shows an entire general configuration of the electromagnetic valve 1 that is, for example, installed in an automatic transmission system of an automobile. The electromagnetic valve 1 switches an oil pathway for control of shift transmission. The electromagnetic valve 1 includes a flow pathway control portion housed in a housing 2, and an electromagnetic solenoid portion 3 connected integrally to the flow pathway control portion.

The flow pathway control portion includes the housing 2 that is tubular and extends in an axial direction of an attachment hole 52. An end tubular portion 2a located on an end of the housing 2 is fitted into and fixed to the attachment hole 52 that forms a circular column-shaped passage inside an automatic transmission device or a passage forming member 5 adjacent to the automatic transmission device. The passage forming member 5 forms an upstream passage 51 that is an oil inflow passage through which a pressure-adjusted oil flows as an example of a working fluid. The upstream passage 51 communicates with an inlet passage 11. The inlet passage 11 is a passage through which the upstream passage 51 communicates with a valve compartment 22.

The housing 2 includes a shaft holding portion 26 located on an opposite side in the axial direction from the end tubular portion 2a fixed to the attachment hole 52. The shaft holding portion 26 holds a shaft 4 movably in the axial direction, and is attached to the electromagnetic solenoid portion 3. An outer side of the shaft holding portion 26 is fitted to an inner side of the electromagnetic solenoid portion 3. The electromagnetic valve 1 is, as shown in FIG. 1, attached to an automatic transmission. The electromagnetic valve 1 is fixed in a state where the end tubular portion 2a of the housing 2 is fitted into the attachment hole 52 of the passage forming member 5, and an outflow port 12 and a downstream passage 53 is connected to each other.

Inside the housing 2, a filter compartment 21 is provided at a position near to an end of the housing 2. The filter compartment 21 is a space of the electromagnetic valve 1 into which the oil from the automatic transmission device flows first. A filter member 8 is installed in the filter compartment 21 to cover an entire cross-section of a passage and percolate the oil that is the working fluid.

The filter member 8 has a circular plate shape and is located on a most upstream part inside the end tubular portion 2a in an oil flow. The filter member 8 includes a mesh portion that is located upstream of the inlet passage 11 and faces to the inlet passage 11. The filter member 8 includes a frame portion surrounding an entire circumference of the mesh portion. The mesh portion is, for example, made by etching of a center part of a circular plate member. Another remained part that has not been etched constitutes the frame portion around the mesh portion. The filter member 8 may be, alternatively, manufactured by bonding or welding a mesh portion and a frame portion which are separate members.

A support member 6 is a tubular member, and integrally includes an attachment portion 60 as a fixed portion fixed on an inner side of the end tubular portion 2a, and a shaft portion 61 having a rod shape and extending downstream from a center part of the attachment portion 60 coaxially with the attachment portion 60. The attachment portion 60 is provided with the inlet passage 11 extending through the attachment portion 60 in the axial direction. The shaft portion 61 supports a valve element 7 such that the valve element 7 is slidable in the axial direction.

The attachment portion 60 has a flange shape protruding radially outward from an upstream end part of the shaft portion 61. In other words, the attachment portion 60 protrudes radially outward from a base part of the shaft portion 61. An outer circumference of the attachment portion 60 is in contact with an inner surface of the end tubular portion 2a. The attachment portion 60 is fixed to the end tubular portion 2a by swaging an inner wall of the end tubular portion 2a partially. Thus, multiple fixed parts are provided on the inner wall of the end tubular portion 2a in order to fix the attachment portion 60 to the housing 2. The number of the inlet passage 11 is one or more, and the inlet passage 11 is located on an inner side of the fixed parts in a radial direction and extends through the attachment portion 60 in the axial direction.

The attachment portion 60 includes a first valve seat 60a that an upstream end portion 74 of the valve element 7 is capable of contacting. The first valve seat 60a is a surface corresponding to a periphery of the base part of the shaft portion 61 of the attachment portion 60. An inner side of the first valve seat 60a adjacent to the shaft portion 61 has the inlet passage 11 as an upstream valve port. Hence, when the upstream end portion 74 contacts the first valve seat 60a, an entire circumference of an end surface of the upstream end portion 74 contacts the first valve seat 60a. Therefore, the inlet passage 11 presents on an inner side of an annular contact portion between the upstream end portion 74 and the first valve seat 60a, and thus the inlet passage 11 is closed. Accordingly, when the upstream end portion 74 contacts the first valve seat 60a, the inlet passage 11 is closed to shut off a flow of fluid from the upstream passage 51 to the valve compartment 22.

The number of the inlet passage 11 and a shape of an end opening of the inlet passage 11 are not limited as long as the inlet passage 11 is located on the inner side of the annular contact portion of the attachment portion 60 that the upstream end portion 74 contacts. A cross-section of the inlet passage 11 may have a rectangular shape, a circular shape, an arc shape, or a slit shape.

The valve element 7 is controlled in its position in the axial direction in between an open state and a closed state by an operation of the electromagnetic valve 1, thereby opening or closing the inlet passage 11. In the open state of the valve element 7, the working fluid is allowed to flow from the upstream passage 51 to the downstream passage 53 through the inlet passage 11. In the closed state of the valve element 7, the flow of the working fluid is shut off.

The valve element 7 is a tubular body and includes a bottom portion 71 contacting a downstream valve port 25 on a downstream side of the valve element 7. The valve element 7 constituting the tubular body includes an upstream end portion 74 having an opening on an upstream side of the valve element 7 opposite the bottom portion 71. A peripheral portion of the bottom portion 71 is a downstream end portion 73. The bottom portion 71 is provided with a pressure release passage 13, and the pressure release passage 13 extends through a part of the bottom portion 71 other than a center part of the bottom portion 71 that contacts the shaft 4. When the downstream valve port 25 is closed, the pressure release passage 13 provides a passage through which an inner compartment 23 provided inside the valve element 7 between the shaft portion 61 and the bottom portion 71 communicates with the downstream valve port 25.

The housing 2 includes the valve compartment 22 that communicates with a downstream side of the inlet passage 11. The downstream valve port 25 is located and open on a downstream end side of the valve compartment 22. The housing 2 includes an inner discharge passage 14 that is positioned downstream of the downstream valve port 25 and communicates with an outer discharge passage 15 (drainage passage). Therefore, the downstream valve port 25 is a passage through which the valve compartment 22 communicates with the inner discharge passage 14. The housing 2 further includes an outflow port 12 that communicates with the valve compartment 22 and extends from a lateral side of the valve compartment 22 so as to intersect the axial direction. The outflow port 12 is connected to the downstream passage 53 that is used as an oil outflow passage formed in the passage forming member 5 and connected to a valve of a transmission.

The housing 2 includes a second valve seat 24 that the downstream end portion 73 of the valve element 7 is capable of contacting. The second valve seat 24 corresponds to a peripheral portion of the downstream valve port 25. Upon the downstream end portion 73 of the valve element 7 contacting the second valve seat 24, the downstream valve port 25 is closed, and a flow of fluid from the valve compartment 22 to the inner discharge passage 14 is shut off. The valve compartment 22 is a space located between the inlet passage 11 and the downstream valve port 25 and houses the valve element 7 and the shaft portion 61 of the support member 6.

The filter member 8 is, for example, fixed integrally to the attachment portion 60 of the support member 6 by multiple fixed parts. The multiple fixed parts are arranged at regular intervals in a circumferential direction around the mesh portion. The multiple fixed parts are obtained via a swaging process by deforming multiple protrusions protruding from an end surface of the attachment portion 60 that contacts the frame portion. Therefore, the filter member 8 and the attachment portion 60 are integrated in a state where the multiple protrusions are inserted into multiple holes of the frame portion. Accordingly, the filter member 8 and the attachment portion 60 are located inside the end tubular portion 2a. The attachment portion 60 includes the multiple fixed parts arranged at intervals around a central axis of the support member 6.

The valve element 7 includes a tubular wall portion 72 coaxially with the shaft portion 61. An inner wall surface of the tubular wall portion 72 contacts an outer wall surface of the shaft portion 61. The tubular wall portion 72 is slidable in the axial direction relative to the shaft portion 61 with keeping contact between the inner wall surface of the tubular wall portion 72 and the outer wall surface of the shaft portion 61. When the downstream end portion 73 of the valve element 7 is in contact with the second valve seat 24, the upstream end portion 74 of the valve element 7 is separated from the first valve seat 60a. In other words, the valve element 7 is in the open state where the working fluid is allowed to flow from the upstream passage 51 to the downstream passage 53 through the inlet passage 11. The working fluid that has passed through the upstream passage 51 flows into the valve compartment 22 through the inlet passage 11.

In this state, a pressure in the valve compartment 22 is increased in accordance with inflow of the working fluid. Hence, a fluid pressure in the valve compartment 22 acts on the valve element 7, and thus the fluid pressure acts also on the inner compartment 23 of the valve element 7. The pressure acting on the inner compartment 23 acts also on a lateral surface of the tubular wall portion 72 of the valve element 7 in the valve compartment 22 and further acts on the inner compartment 23 through a sliding part between the tubular wall portion 72 and the shaft portion 61. Therefore, the support member 6 guides in the axial direction a reciprocating motion of the valve element 7 that receives an acting force from the shaft 4 or the fluid pressure. The valve element 7 includes the pressure release passage 13 extending through the bottom portion 71. Hence, a pressure acting on the inner compartment 23 is released to the inner discharge passage 14 through the pressure release passage 13. Accordingly, an increment in inner pressure of the inner compartment 23 can be limited. Thus, even when a high fluid pressure acts on the valve compartment 22, a pressure that the valve element 7 receives in the axial direction can be reduced.

Figure 3:
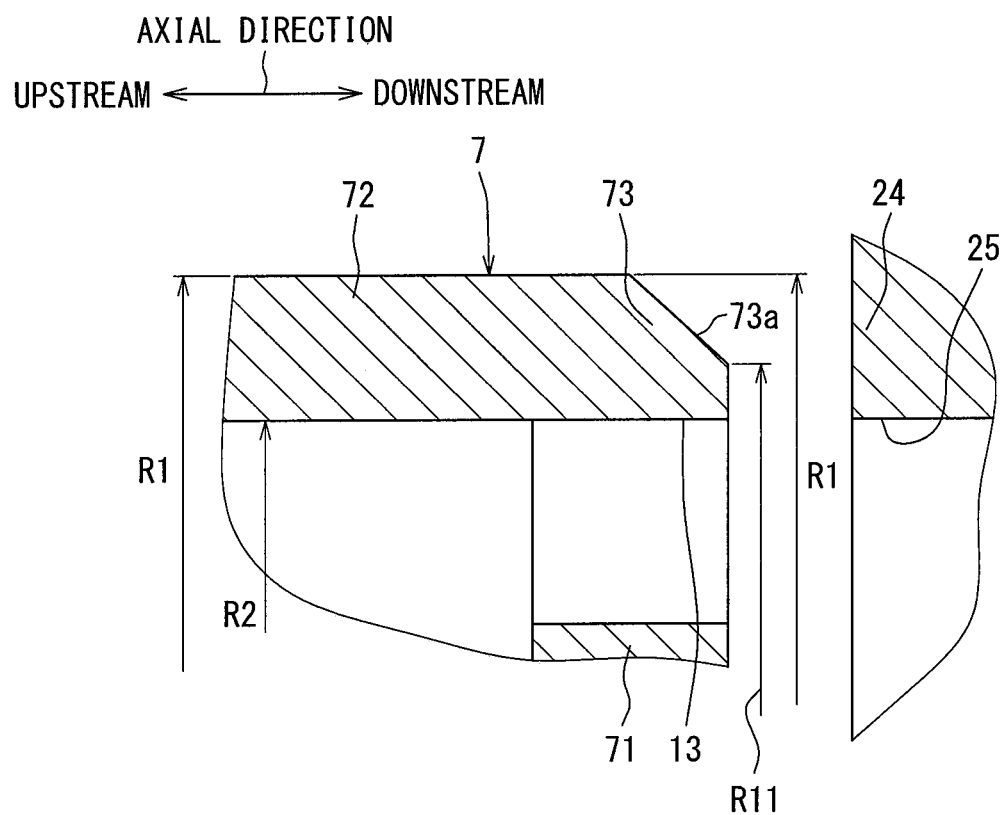
FIG. 3 is a sectional diagram illustrating a downstream end portion of a valve element of the electromagnetic valve according to the exemplar embodiment.

As shown in FIG. 3, the downstream end portion 73 includes a pressure receiving portion 73a that is located on a downstream end contacting the second valve seat 24 and has a diametrical dimension that gradually decreases in a downstream direction. A diametrical dimension R11 of a part of the downstream end portion 73 that contacts the second valve seat 24 is smaller than a diametrical dimension R1 of the tubular wall portion 72 positioned upstream of the downstream end portion 73. The pressure receiving portion 73a facing the second valve seat 24 has a cross-section along the axial direction such that a radius (i.e. protruding degree radially outward) decreases in the downstream direction. The cross-section of the pressure receiving portion 73a along the axial direction has a surface line that is an inclined straight line or a curved line. Additionally, the diametrical dimension R11 of the downstream end surface of the valve element 7 that contacts the second valve seat 24 is larger than or equal to an inner diametrical dimension R2 of the tubular wall portion 72, as shown in FIG. 3.

The valve element 7 includes the pressure receiving portion 73a on the downstream end portion 73 such that the diametrical dimension R1 is larger than the diametrical dimension R11. This configuration, when the pressure in the valve compartment 22 becomes high in a state where the downstream valve port 25 is closed, contributes to a control of the valve element 7 such that the downstream end portion 73 is not strongly pressed against the second valve seat 24. In other words, this configuration contributes to a control such that a force pressing the second valve seat 24 downstream is reduced.

An oil, which has a higher pressure than a fuel vapor, flows as the working fluid in the electromagnetic valve 1. In order to restrict leakage of the fluid, the electromagnetic valve 1 includes an O-ring seal 27 mounted on an outer circumference of the end tubular portion 2a and located between the outflow port 12 and a first end of the housing 2 opposite from the electromagnetic solenoid portion 3. Further, the electromagnetic valve 1 includes an O-ring seal 28 mounted on the outer circumference of the end tubular portion 2a and located between the outflow port 12 and a second end of the housing 2 connected to the electromagnetic solenoid portion 3. Each of the O-ring seal 27 and the O-ring seal 28 is an annular sealing member fitted into a groove formed on an entire circumference of the end tubular portion 2a.

The valve element 7 is displaced in the axial direction by a pressing force of the shaft 4 that is moved in the axial direction by the electromagnetic solenoid portion 3. The valve element 7 is switched between the open state contacting with the second valve seat 24 surrounding the downstream valve port 25 and the closed state contacting the first valve seat 60a. In the closed state, a communication between the outflow port 12 and the upstream passage 51 is shut off, and an end portion 41 of the shaft 4 presses the bottom portion 71 to open the downstream valve port 25. Thus, a communication between the downstream passage 53 and the outer discharge passage 15 is allowed in the closed state of the valve element 7. In the open state, the communication between the outflow port 12 and the upstream passage 51 is allowed, and the valve element 7 contacts the second valve seat 24 to close the downstream valve port 25. Thus, the communication between the downstream passage 53 and the outer discharge passage 15 is shut off.

The electromagnetic solenoid portion 3 disposed on the second end of the housing 2 includes a yoke 31, a bobbin 34, a coil 32, a movable element 33, the shaft 4, a spring 45 and a connector 35. The bobbin 34 is made of resin and has an approximately cylindrical hollow shape. The bobbin 34 is disposed inside the yoke 31. The coil 32 is wound around an outer circumferential surface of the bobbin 34. The yoke 31 is made of magnetic material. The yoke 31 supports an inner circumferential side of the bobbin 34 and covers an outer circumferential side of the coil 32. The yoke 31 is coaxial with the bobbin 34. The bobbin 34 is coaxial with the housing 2 and houses a part of the housing 2 that supports the shaft 4 slidably. The yoke 31, the movable element 33 and the shaft 4 are coaxial with the housing 2, similar to the bobbin 34.

The movable element 33 is made of magnetic material and has a cylindrical hollow shape. The movable element 33 is supported by the yoke 31 and is reciprocatable in the axial direction. In the electromagnetic solenoid portion 3, the movable element 33 and the yoke 31 form a magnetic circuit.

A large diameter portion 44 of the shaft 4 is fixed to an end surface on a bottom side of the movable element 33 and is coaxial with the movable element 33. The shaft 4 and the movable element 33 are capable of reciprocating together in the axial direction as an integrated single member. The shaft 4 integrally includes the end portion 41 having a relatively small diameter and being concentric with the downstream valve port 25, and the large diameter portion 44 slidably fitted into the shaft holding portion 26 via a step portion 43. The inner discharge passage 14 is connected to the outer discharge passage 15 formed in the second end of the housing 2. The outer discharge passage 15 extends in the housing 2 at right angle with the inner discharge passage 14 and is located adjacent to the shaft holding portion 26 between the shaft holding portion 26 and the first end of the housing 2. The outer discharge passage 15 is a drainage passage provided in the housing 2 and used as a drainage port.

The spring 45 used as an example of an urging member is interposed between the step portion 43 and the periphery of the downstream valve port 25. The spring 45 always exerts an urging force pressing the shaft 4 toward the movable element 33. Accordingly, when the electromagnetic solenoid portion 3 is not energized, the shaft 4 is urged by the spring force of the spring 45. Hence, the end portion 41 of the shaft 4 separates from the bottom portion 71. The valve element 7 opens the inlet passage 11 due to the fluid pressure while the valve element 7 closes the downstream valve port 25. In this state, the communication between the upstream passage 51 and the downstream passage 53 is allowed. The oil from the upstream passage 51 passes through the inlet passage 11, the valve compartment 22 and the outflow port 12, thereby flowing to the downstream passage 53.

The connector 35 is formed together with an outer skin of the coil 32 and located on a lateral side of the yoke 31. The connector 35 is provided for energizing the coil 32. A terminal 35a inside the connector 35 is electrically connected to the coil 32. The electromagnetic solenoid portion 3 is capable of controlling an electric current flowing through the coil 32 by electrically connecting the terminal 35a to a current controller via the connector 35.

When the coil 32 of the electromagnetic solenoid portion 3 is energized, a magnetic flux is generated in the magnetic circuit formed by the yoke 31 and the movable element 33. Thus, the movable element 33 is attracted toward the first end of the housing 2 in the axial direction while the shaft 4 is moved toward the first end of the housing 2 against the urging force of the spring 45. At this time, the valve element 7 is pressed in the upstream direction by the shaft 4, thereby opening the downstream valve port 25 and closing the inlet passage 11. In this state, the communication between the upstream passage 51 and the downstream passage 53 is shut off, and the communication between the downstream passage 53 and the outer discharge passage 15 is allowed. The oil from the downstream passage 53 passes through the outflow port 12, the valve compartment 22, the downstream valve port 25 and the inner discharge passage 14, and flows to the outer discharge passage 15. Accordingly, a switching control (i.e. on/off control) of energization of the coil 32 enables a switching control (i.e. on/off control) of pressure of the working fluid in an oil discharge passage. Therefore, a pressure and a flow rate of the working fluid used for control of a controlled object can be controlled.

Next, actions and effects provided by the electromagnetic valve 1 of the exemplar embodiment will be described. The electromagnetic valve 1 includes a housing 2 that includes an end tubular portion 2a fitted to the attachment hole 52 of the passage forming member 5. The passage forming member 5 includes the upstream passage 51 through which the working fluid flows toward the electromagnetic valve 1, and the downstream passage 53 through which the working fluid flows out of the electromagnetic valve 1. The housing 2 further includes the valve compartment 22 inside the end tubular portion 2a. The electromagnetic valve 1 includes the inlet passage 11 through which the upstream passage 51 communicates with the valve compartment 22, the valve element 7 provided in the valve compartment 22, the support member 6 supporting the valve element 7 slidably, the shaft 4 displacing the valve element 7 upstream, and the electromagnetic solenoid portion 3 driving the shaft 4. The valve element 7 opens or closes the inlet passage 11 in between the open state where the working fluid is allowed to flow from the upstream passage 51 to the downstream passage 53 through the inlet passage 11 and the closed state where the flow of the working fluid is shut off. The support member 6 includes the attachment portion 60 through which the inlet passage 11 extends, the attachment portion 60 being fixed to the inner side of the end tubular portion 2a, and the shaft portion 61 extending from the attachment portion 60 downstream and supporting the valve element 7 to be slidable in the axial direction. The valve element 7 includes the tubular body including the inner wall surface contacting the outer wall surface of the shaft portion 61 of the support member 6, and the bottom portion 71 pressed by the shaft 4. The valve element 7 includes the pressure release passage 13 extending through a part of the bottom portion 71 that does not contact the shaft 4. The inner compartment 23 communicates with the outer discharge passage 15 through the pressure release passage 13 in the open state of the valve element 7.

When a high supply pressure of the working fluid acts on the valve compartment 22 through the inlet passage 11, the pressure is separated into an inner side and an outer side of the valve element 7 through a sliding part between the valve element 7 and the support member 6. Therefore, the electromagnetic valve 1 is capable of maintaining the pressure in the valve compartment 22 high.

In the open state of the valve element 7 where the working fluid flows from the upstream passage 51 to the downstream passage 53 through the inlet passage 11, the inner compartment 23 of the valve element 7 communicates with the outer discharge passage 15 through the pressure release passage 13 that extends through the bottom portion 71 of the valve element 7. Accordingly, the pressure in the inner compartment 23 can be released to the outer discharge passage 15 through the pressure release passage 13. When the supply pressure of the working fluid acts on the valve compartment 22 through the inlet passage 11, the pressure in the inner compartment 23 increases. However, the pressure can be released downstream through the pressure release passage 13. Hence, a pressure pressing the bottom portion 71 of the valve element 7 downstream can be reduced. Since the pressure pressing the valve element 7 can be reduced, a valve driving force of the electromagnetic solenoid portion 3 for driving the shaft 4 upstream can be reduced. Since the valve driving force of the electromagnetic solenoid portion 3 can be reduced, a flow-rate characteristic can be ensured without enlarging the size of the electromagnetic valve 1. According to the electromagnetic valve 1, deterioration in flow-rate characteristic can be limited, and miniaturization of a device including the electromagnetic valve 1 can be achieved by reducing a necessary valve driving force. Further, according to the electromagnetic valve 1, not only the size enlargement can be avoided, but also a necessary current for driving the valve element 7 can be reduced. Thus, energy consumption can be reduced.

The valve element 7 is configured such that the diametrical dimension R11 of a contact part of the downstream end portion 73 that contacts the second valve seat 24 in the open state is smaller than the diametrical dimension R1 of the upstream end portion 74 that closes the inlet passage 11 in the closed state. The diametrical dimension R11 is configured to be larger than or equal to the inner diametrical dimension R2 of the tubular wall portion 72.

According to the electromagnetic valve 1, the working fluid flowing into the valve compartment 22 through the inlet passage 11 in the open state provides a pressure pressing the end surface of the upstream end portion 74 downstream and a pressure pressing the end surface of the downstream end portion 73 upstream. Since the diametrical dimension R11 is smaller than the diametrical dimension R1, the pressure pressing the end surface of the upstream end portion 74 downstream becomes higher than the pressure pressing the end surface of the downstream end portion 73 upstream. A function to shut off the downstream valve port 25 can be enhanced with the diametrical dimension R11 approaching the diametrical dimension R1. A function to reduce a pressure of the downstream end portion 73 pressing the second valve seat 24 downstream can be enhanced with the diametrical dimension R11 approaching the inner diametrical dimension R2.

The disclosure in the present specification is not limited to the exemplified embodiments. The disclosure includes the exemplified embodiments and modifications based on these by a skilled person. For example, the disclosure is not limited to a combination of components or elements shown in the embodiments, and can be modified variously to be implemented. The disclosure can be implemented based on a variety of combinations. The disclosure is capable of having an additional portion that can be added to the embodiments. The disclosure includes one from which the components or elements of the embodiments are omitted. The disclosure includes displacement or combination of components or elements between one embodiment and another embodiment. The disclosed technical scope is not limited to the descriptions of the embodiments.

The electromagnetic valve 1 of the above-described embodiment may not include the O-ring seal 27 or the O-ring seal 28 as long as a certain degree of sealing performance is maintained.

The working fluid flowing through the electromagnetic valve 1 of the above-described embodiments may employ another liquid having a high viscosity other than the oil.

The O-ring seal 27 or the O-ring seal 28 of the above-described embodiments is an example of a sealing member, and a sealing member applicable to the electromagnetic valve 1 is not limited to such rubber member having a circular shape in cross-section. For example, a material for the sealing member may be an elastically-deformable material other than rubber, and a cross-sectional shape thereof may be rectangular.

In the above-described embodiments, the number or shape of the pressure release passage 13 are not limited a certain number or shape as long as the pressure release passage 13 is provided on a position of the bottom portion 71 other than a part of the bottom portion 71 contacting the shaft 4. A passage cross-sectional shape of the pressure release passage 13 may be rectangular, circular, arc-like, or slit-like, for example.

Additional advantages and modifications will readily occur to those skilled in the art. The disclosure in its broader terms is therefore not limited to the specific details, representative apparatus, and illustrative examples shown and described.

What is claimed is:

1. An electromagnetic valve comprising:
   a housing including an end tubular portion fitted to an attachment hole of a passage forming member, and a valve compartment positioned on an inner side of the end tubular portion, the passage forming member including an upstream passage through which a working fluid flows toward the electromagnetic valve, and a downstream passage through which the working fluid flows out of the electromagnetic valve;
   an inlet passage positioned on the inner side of the end tubular portion, the upstream passage and the valve compartment communicating with each other through the inlet passage;
   a valve element provided in the valve compartment to open or close the inlet passage in between an open state in which the working fluid is allowed to flow from the upstream passage through the inlet passage to the downstream passage and a closed state in which a flow of the working fluid is shut off;
   a support member including a fixed portion fixed on the inner side of the end tubular portion, the inlet passage extending through the fixed portion, and a shaft portion having a shape extending downstream from the fixed portion and supporting the valve element slidably in an axial direction;
   a shaft pressing and moving the valve element in the axial direction to be in the closed state; and
   an electromagnetic solenoid portion generating a driving force for driving the shaft upstream, wherein
   the valve element includes: a tubular body having a bottom portion pressed against the shaft and having an inner surface contacting an outer surface of the shaft portion; a pressure release passage extending through a part of the bottom portion which does not contact the shaft; and an inner compartment that is provided inside the tubular body and communicates with a drainage passage through the pressure release passage in the open state of the valve element.

2. The electromagnetic valve according to claim 1, wherein
   the valve element includes a downstream end portion that includes the bottom portion and has a contact part contacting a valve seat provided on the housing in the open state, and an upstream end portion that closes the inlet passage in the closed state, and
   a diametrical dimension of the contact part of the downstream end portion is smaller than a diametrical dimension of the upstream end portion and is equal to or larger than an inner diametrical dimension of the tubular body.

* * * * *